United States Patent
Gross

(10) Patent No.: US 9,662,770 B1
(45) Date of Patent: May 30, 2017

(54) TONGS WITH COOKING GRATE MANIPULATOR

(71) Applicant: William Powers Gross, Jacksonville, IL (US)

(72) Inventor: William Powers Gross, Jacksonville, IL (US)

(73) Assignee: William Powers Gross, Jacksonville, IL (US)

(*) Notice: Subject to any disclaimer, the term of this patent is extended or adjusted under 35 U.S.C. 154(b) by 0 days.

(21) Appl. No.: 15/011,061

(22) Filed: Jan. 29, 2016

(51) Int. Cl.
*B25B 7/00* (2006.01)
*B25B 9/00* (2006.01)
*B25B 9/02* (2006.01)
*A47J 43/28* (2006.01)

(52) U.S. Cl.
CPC .............. *B25B 9/02* (2013.01); *A47J 43/283* (2013.01)

(58) Field of Classification Search
CPC .. F23J 1/04; A47J 43/283; A47J 45/10; F24B 15/10; B65G 7/12; B25J 1/04; B25J 7/00; B25B 9/02
USPC .......................................................... D8/14
See application file for complete search history.

(56) References Cited

U.S. PATENT DOCUMENTS

| | | | | |
|---|---|---|---|---|
| 1,587,350 A | * | 6/1926 | Parke | A47J 45/10 294/9 |
| 2,833,239 A | * | 5/1958 | Larsen | B23K 3/063 228/57 |
| 4,471,985 A | | 9/1984 | Mahoney | |
| 4,482,181 A | * | 11/1984 | Shepherd | A47J 37/0786 294/12 |
| 5,192,106 A | * | 3/1993 | Kaufman | G11B 23/00 294/16 |
| 5,729,854 A | | 3/1998 | Powers | |
| 6,485,074 B1 | | 11/2002 | Floyd | |
| 6,959,951 B2 | * | 11/2005 | Amodeo | A47J 45/10 294/10 |
| 8,256,808 B2 | | 9/2012 | Spellman | |
| 8,556,310 B1 | | 10/2013 | Nabors | |
| 8,579,341 B2 | * | 11/2013 | Greer | A47J 37/0786 294/131 |
| 8,740,269 B2 | * | 6/2014 | Greer | A47J 37/0786 294/131 |
| 8,851,540 B1 | | 10/2014 | Gaulke | |
| 9,220,363 B2 | | 12/2015 | Sassaman | |

OTHER PUBLICATIONS

Screen shots from http://www.theoriginalgrategrabber.com/care---info.html—accessed Jan. 20, 2016, (6 pages).

* cited by examiner

*Primary Examiner* — Stephen Vu
(74) *Attorney, Agent, or Firm* — Cook Alex Ltd.

(57) ABSTRACT

Multi-purpose cooking tongs that are configured to grasp food and bars of a cooking grate.

19 Claims, 5 Drawing Sheets

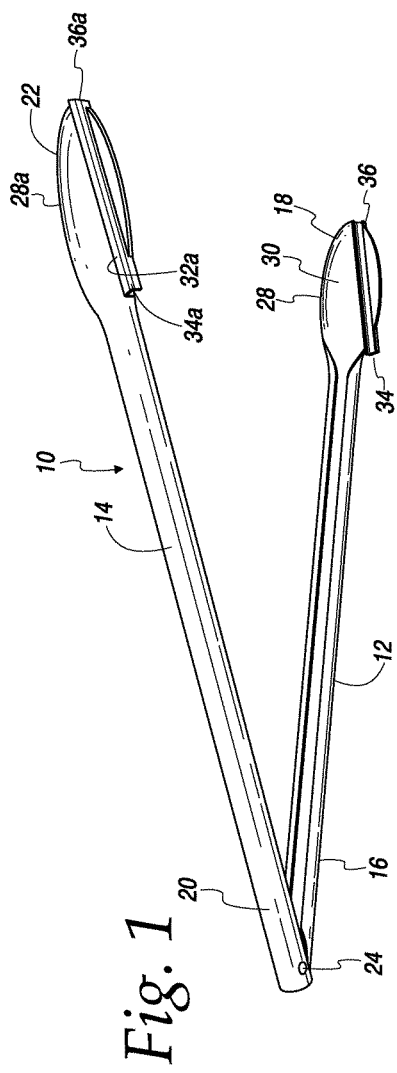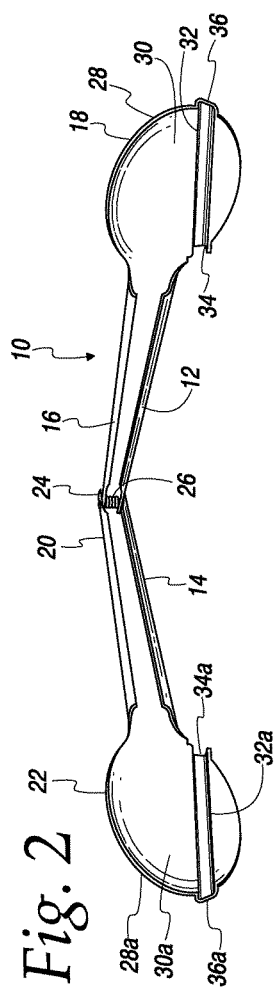

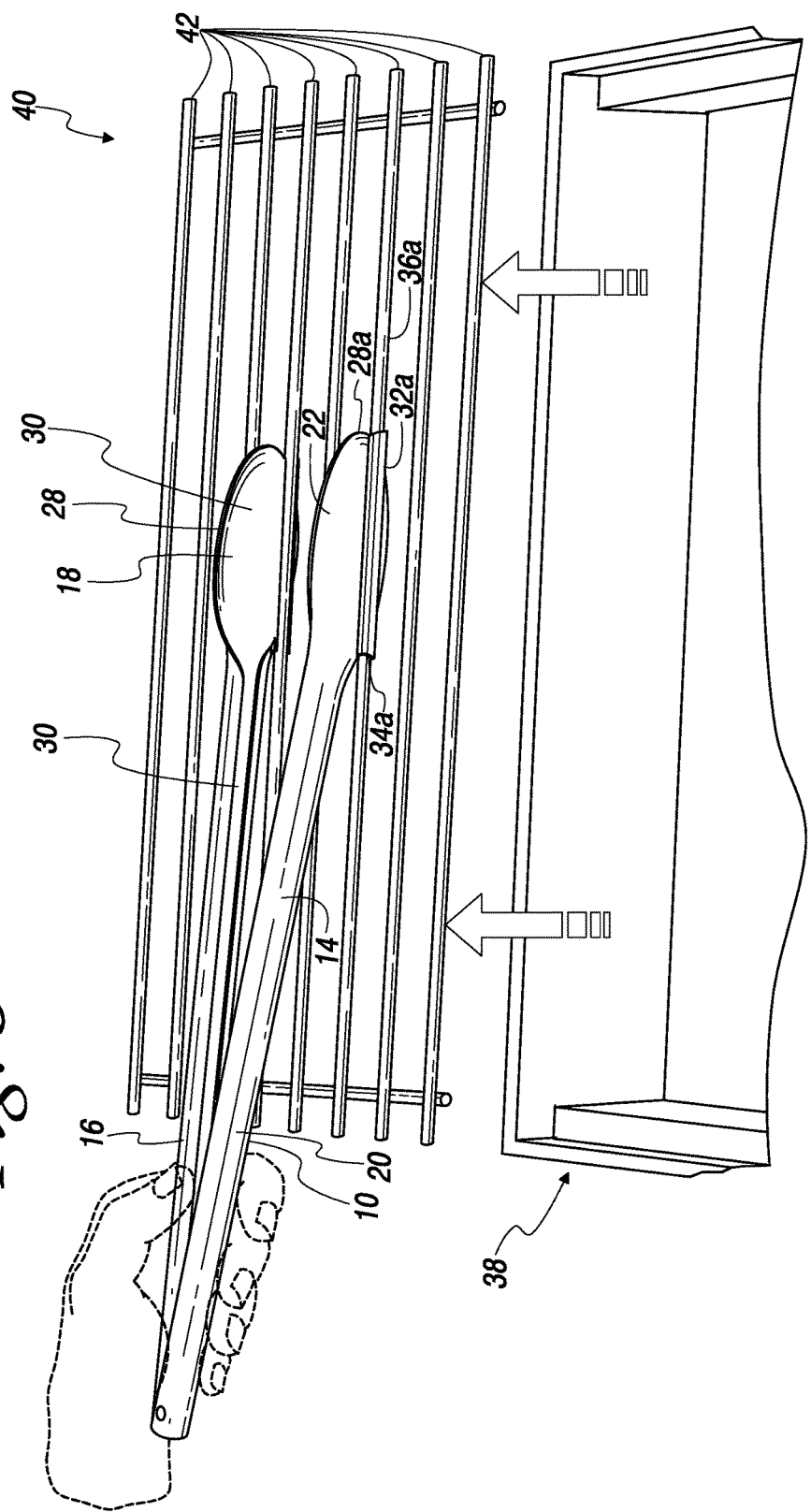

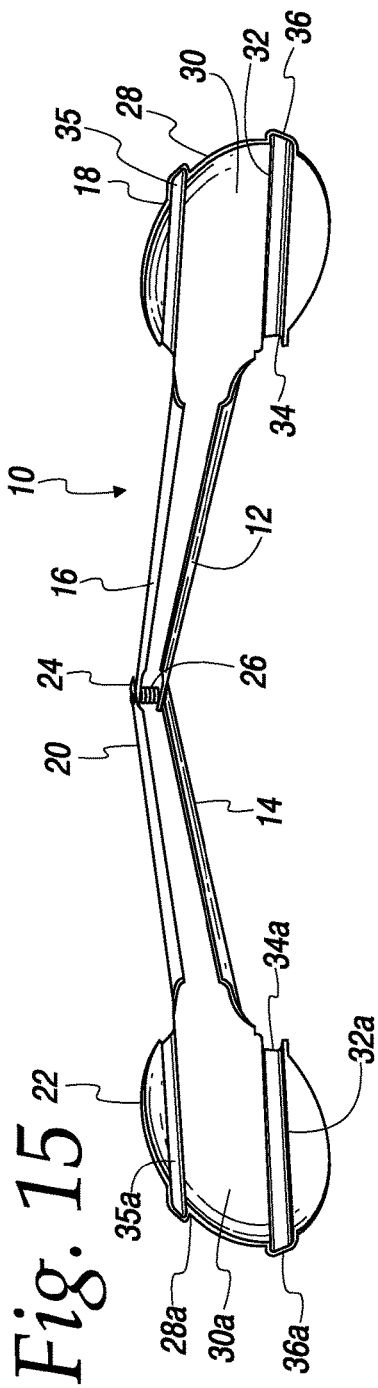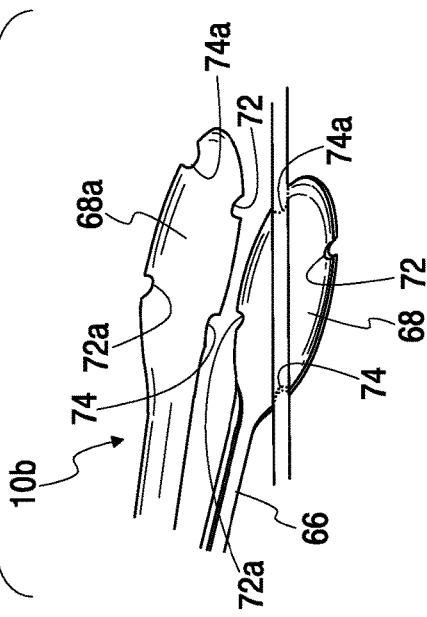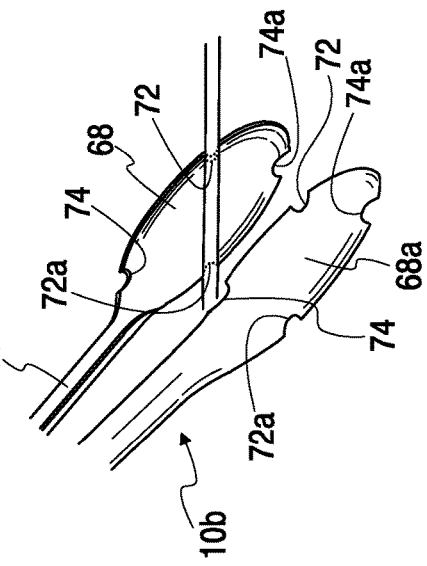

TONGS WITH COOKING GRATE MANIPULATOR

TECHNICAL FIELD

The present disclosure generally relates to cooking tongs, and more specifically to multi-purpose cooking tongs that are designed to grasp cooking items and to grasp and manipulate cooking grates.

BACKGROUND

Barbeque grills, kitchen ovens, smokers, etc. all typically include some fashion of a cooking grate onto which the food or cooking vessels are put during the cooking process. Customarily, such cooking grates include parallel spaced apart bars onto which the food or cooking vessels are placed. During the cooking process, it is oftentimes required or desirable to move, lift or otherwise manipulate the cooking grate. For example, when cooking on a barbeque grill, it may be necessary to load charcoal into the grill, adjust the placement of charcoal and/or remove spent charcoal from the barbeque grill. In order to accomplish such tasks, the cooking grate must first be lifted off of the grill and out of the way. Because the cooking grate is typically very hot, the use of a tool to lift the cooking grate is practically required because the cooking grate is too hot to use one's hands, even with insulated grill mitts.

The lifting and manipulation of cooking grates, in the past, has typically been accomplished with tools that were not well suited for such purpose. Individuals regularly attempt to use long-handled forks, spatulas and the like to attempt to manipulate the cooking grate. Such tools are not meant for manipulating cooking grates and one is not able to obtain a good, stable grip with such makeshift tools. Because of this, the cooking grate is often dropped and/or desired placement of the cooking grate is difficult to achieve. When the cooking grate is hot, attempting to move the cooking grate with makeshift tools creates a risk for accidents and injury.

There are tools available in which the sole purpose of the tool is to lift and manipulate the cooking grate. While using such tools has some advantages, it also has some disadvantages. For example, an additional tool is required for cooking and one must switch tools when he/she wants to lift, move or otherwise manipulate the cooking grate. Having to use multiple tools when cooking on a barbeque grill, oven or smoker can be a hassle and an annoyance to cook.

Therefore, there remains a need for convenient tools for lifting, moving and/or otherwise manipulating cooking grates.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

Figure 4:
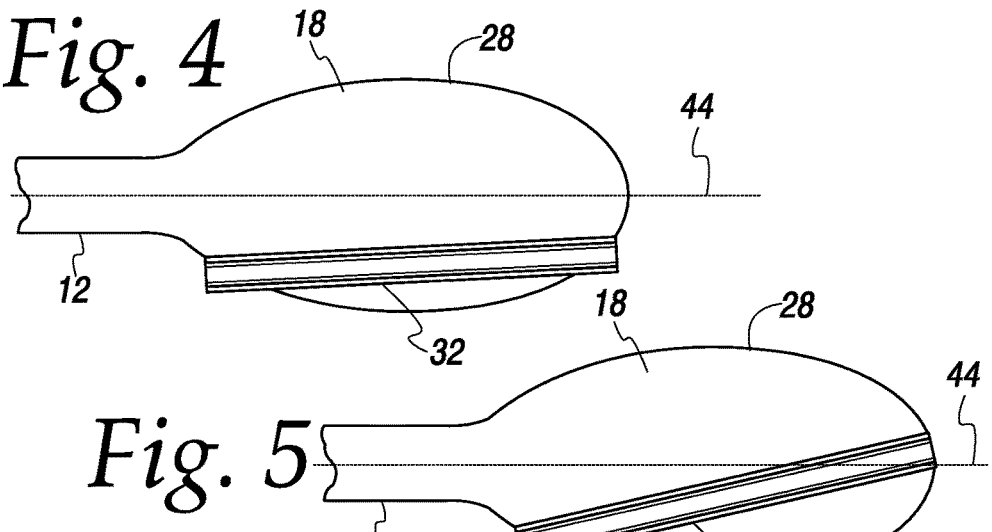

In one aspect of the present disclosure, a pair of tongs includes a first tong arm having a proximal end portion and a distal end portion and a second tong arm having a proximal end portion and a distal end portion. The proximal end portion of the second tong arm is pivotally attached to the proximal end portion of the first tong arm so that the distal end portions of the first and second tong arms are moveable inwardly toward each other and outwardly away from each other. The distal end portions of the first and second tong arms each have a grasping member wherein each grasping member includes a channel extending therealong for engaging bars of a cooking grate.

In another aspect, a pair of tongs includes opposed first and second tong arms each having a proximal end portion and a distal end portion wherein the proximal end portions of the tong arms are pivotally attached to each other so that the distal end portions of the first and second tong arms are moveable inwardly toward each other and outwardly away from each other. The distal end portions of each the tong arms defining a grasping surface for grasping items between the distal end portions of the tong arms when the tong arms are moved inwardly toward each other. The distal end portions of each of the tong arms having a cooking grate bar engaging member for engaging and grasping bars of a cooking grate.

BRIEF DESCRIPTION OF DRAWINGS

FIG. 1 is a perspective view of one embodiment of a pair of tongs in accordance with the present disclosure;

FIG. 2 is a front perspective view of the tongs shown in FIG. 1;

FIG. 3 is a perspective view of the tongs of FIG. 1 shown lifting a cooking grate off of a barbeque grill;

FIGS. 4-6 are partial elevational views of various different configurations of the distal end portion of the tong arms in accordance with the present disclosure;

FIGS. 7-9 are cross-sectional views of various different configurations of the cooking grate engaging member in accordance with the present disclosure;

FIG. 10 is a partial perspective view of the distal end portion of a pair of tongs in accordance with another embodiment of the present disclosure;

FIG. 11 is a front end view of one of the tongs of FIG. 10;

FIG. 12 is a partial perspective view of the distal end portion of a pair of tongs in accordance with another embodiment of the present disclosure;

FIG. 13 is a front end view of one of the tongs of FIG. 12;

FIG. 14 is a partial perspective view of the distal end of a pair of tongs in accordance with another embodiment of the present disclosure;

FIG. 15 is a perspective view of another embodiment of a pair of tongs in accordance with the present disclosure;

FIG. 16 is a partial perspective view of the distal end of a pair of tongs in accordance with another embodiment of the present disclosure; and FIG. 17 is a partial perspective view of the distal end of the tongs of FIG. 16 shown in a flipped orientation.

DETAILED DESCRIPTION

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

FIG. 1 illustrates one embodiment of a pair of tongs 10 in accordance with the present disclosure. Tongs 10 include a first tong arm 12 connected to an opposed second tong arm 14. The first tong arm 12 includes a proximal end portion 16 and a distal end portion 18. Similarly, the second tong arm 14 includes a proximal end portion 20 and a distal end portion 22. The proximal end portions 16 and 20 of the first and second tong arms 12 and 14, respectively, are connected such that the tong arms 12 and 14 can be moved toward a closed position wherein the arms 12 and 14 are moved toward each other, and toward an open position wherein the arms 12 and 14 are moved away from each other. In particular, the proximal end portions 16 and 20 are pivotally attached to one another so that a user may squeeze the tong arms 12 and 14 together to move the distal end portions 18 and 22 of tong arms 12 and 14 toward each other. The proximal end portions 16 and 20 of tong arms 12 and 14 may be attached by a hinge pin 24. Optionally, tong arms 12 and 14 may be biased toward the open or closed position by a biasing member 26, such as a spring, as shown in FIG. 2. In other embodiments, the proximal end portions 16 and 20 of tong arms 12 and 14 may be integrally formed, i.e., formed from one piece that may, for example, be in a generally U-shaped configuration. Tongs 10 may optionally also include a locking mechanism (not shown) for locking the tongs in a closed position. In other embodiments, the tongs may have any well-known conventional tong arrangements. Advantageously, the configuration of the tongs allows the user to operate the tongs with one hand. Although the tongs could also be operated with both hands, if desired.

Referring to FIGS. 1 and 2, each of the distal end portions 18 and 22 of the tong arms 12 and 14, respectively, define a grasping member 28, 28a for grasping items therebetween when tong arms 12 and 14 are moved inwardly toward a closed position. The grasping members 28, 28a each define a grasping surface 30, 30a that contacts the item, such as food, when the tongs are moved toward a closed position. In the illustrated embodiment, the grasping members 28, 28a each have a similar generally round or oval shape. The grasping members or surfaces may be a flange that may define a spatula, spoon-like configuration or fork for grasping items. For example, the grasping members 28, 28a may each be a spatula that can be placed under and over a cooking food item (burger, steak, etc.) to grasp and flip food item. The grasping members may take any number of various shapes, such as square, rectangular, circular, fork, concave, convex, etc. Also, the grasping members 28, 28a may be similarly or differently shaped. The edges of grasping members 28, 28a may have various configurations, such as a crenated, serrated, crenellated, etc.

Each of grasping members 28, 28a, and therefore the distal end portions 18 and 22, of tong arms 12 and 14 includes a cooking grate bar engaging member configured to engage and grasp a cooking grate. In the illustrated embodiment, the cooking grate bar engaging members include channels 32, 32a. The channels 32, 32a are shown as generally elongated and they each include a proximal end opening 34, 34a and a distal end opening 36 and 36a. Channels 32, 32a are sized and configured to engage and grasp bars of a cooking grate so that the user can lift, move and/or otherwise manipulated the cooking grate. The cooking grate may be that of a barbeque, oven, smoker or any other cooking apparatus. As the tong arms 12 and 14 move toward the closed position, the distal end portions 18 and 22 move to a location wherein the channels 32, 32a may, but not necessarily, extend generally parallel to one another so as to be in position to engage the same bar or different parallel bars of a cooking grate. Additionally, the grasping surfaces, such as the flange, may extend above and/or below channels 32, 32a.

In FIG. 3, there is shown a barbeque grill 38 having a cooking grate 40 associated therewith. The cooking grate 40 includes generally parallel spaced apart bars 42. In use, tongs 10 provide a dual purpose tool wherein one of the purposes is to grasp items, such a food, cooking vessels, coals, etc. and the other purpose is to securely grasp cooking grate 40 so that user can safety and conveniently manipulate the cooking grate, i.e., lift, position, reposition or move. As shown in FIG. 3, the user may operate the tongs 10 with one hand to position each of the distal end portions 18 and 22 of tong arms 12, 14 between the bars 42 of cooking grate 40. The user then squeezes tongs 10 toward the closed position so that channels 32, 32a engage bars 42. Channels 32, 32a also may engage either side of the same bar or two different bars. In this position, it is desirable but not necessary, for channels 32, 32a to be generally parallel. Channels 32, 32a may engage bars 42 securely without being generally parallel. As shown in FIG. 3, the bars 42 may extend through proximal end openings 34, 34a and distal end openings 36, 36a of channels 32, 32a. Also, in the illustrated embodiment, channels 32, 32a are generally co-extensive with grasping members 28, 28a. In other embodiments, channels 32, 32a may be shorter than the grasping member or extend out proximally or distally beyond the grasping member, which in some instances may provide more leverage and support for lifting cooking grate 40.

With channels 32, 32 engaging bars 42, the user may use tongs 10 to manipulate cooking grate 40. Once the user is finished manipulating cooking grate 40, the user may move tong arms 12, 14 away from each other toward the opened position to disengage channels 32, 32a from the bars 42 of cooking grate 40. As such, tongs 10 provide a single multi-purpose tool that may be used to manipulate food and other cooking items and also be used to safely and securely manipulate a cooking grate. In another example, tongs 10 may be used to engage an oven cooking grate wherein tongs 10 engage and grasp the oven cooking grate and are used to slide the cooking grate back and forth into and out of the oven.

FIGS. 4-17 illustrate various embodiments and designs for the tongs disclosed herein and it will be understood that any of the variations or designs may be employed on any of the tongs disclosed herein. Referring first to FIG. 15, each of the grasping members 28 of tongs 10 may include a second channel 35, 35a, respectively. The second channel allows for the user to grasp the cooking grate regardless of the top to bottom orientation of the tongs. Each of the channels 35, 35a may extend parallel to its respective first channel. Alternatively, each of the channels 35, 35a may extend at an angle to its respective first channel. This provides the tongs with different gripping angles for gripping the cooking grate, i.e., the first channels 34, 34a provide a first gripping angle and the second channels 35, 35a provide a second gripping angle.

Figure 5:
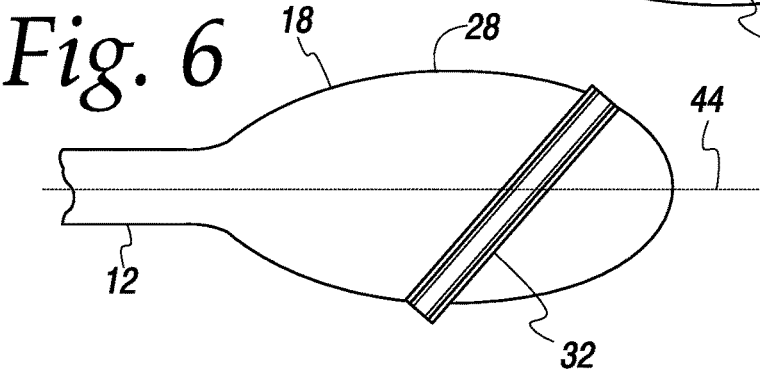
Figure 6:
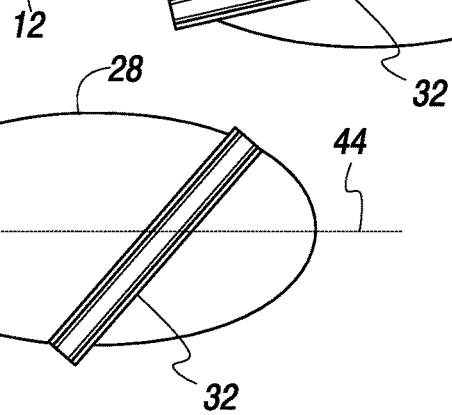

Referring to FIGS. 4-6, there are shown alternative embodiments of tongs 10 wherein the channel 32 may extend at various different angles relative to the longitudinal axis 44 of the tong arm 12. These figures only illustrate tong arm 12 and it will be understood that channel 32a of tong arm 14 will extend at the same angle as channel 32. Although channels 32 and 32a extend at the same angle, grasping members 28 and 28a do not necessarily have to have the same configuration and each could differ in shape and size from the other. In one embodiment, channels 32, 32a may extend at an angle of about 5 degrees to about 90 degrees relative to longitudinal axis 44 of the respective tong arm 12, 14. In one embodiment the angle is between about 5 degrees and about 55 degrees and preferably is about 30 degrees.

Figure 7:
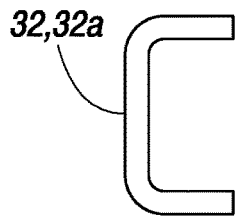
Figures 8, 9:
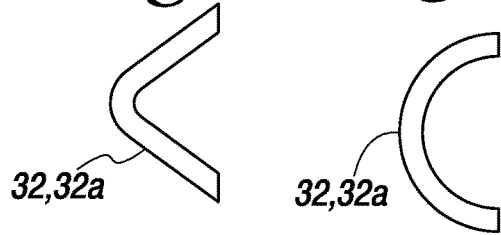

FIGS. 7-9 are cross-sectional views illustrating various different shapes that channels 32, 32a may have. In FIG. 7, channels 32, 32a have a generally U-shaped configuration. In FIG. 8, channels 32, 32a have a generally V-shaped configuration and in FIG. 9, channels 32, 32a have a generally C-shaped configuration.

Figure 10:
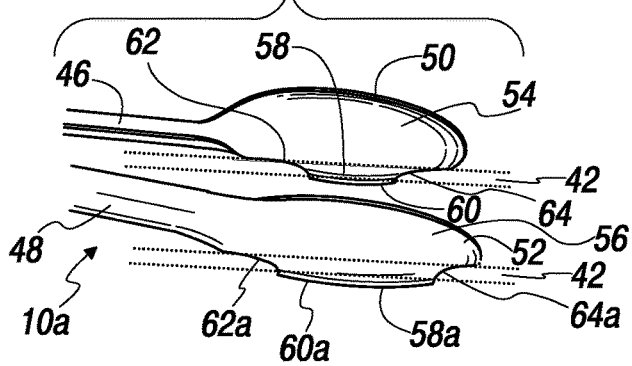
Figure 11:
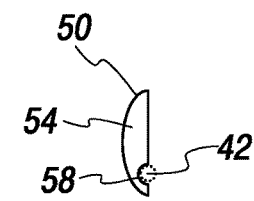

Turning to FIGS. 10-13, these figures illustrate embodiments in which the channels for engaging the bars of a cooking grate are at least partially defined by the lower edge of the distal end portion of the tong arm. Turning first to FIGS. 10 and 11, there is shown tongs 10a which include tong arms 46 and 48. Tong arm 46 includes distal end portion 50 and tong arm 48 includes distal end portion 52. Distal end portions 50 and 52 each define a grasping member 54 and 56, respectively. Each of the grasping members has a cooking grate engaging member, such as channels 58, 58a configured to engage the bars of a cooking grate. Channels 58, 58a are at least partially defined by the lower edge 60, 60a of the respective distal end portion 50, 52 wherein the lower edges project outwardly from the respective grasping member. The channels 58, 58 also at least partially defined by rounded proximal end notches 62, 62a and rounded distal end notches 64, 64a. Tongs 10a are shown with bars 42 of a grate (in phantom) engaged with channels 58, 58a.

Figure 12:
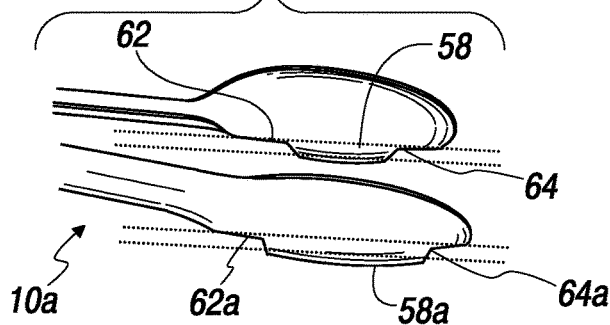
Figure 13:
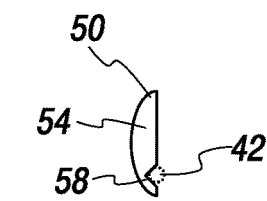

Referring to FIGS. 12 and 13, the channels 58, 58a of tongs 10a include angled proximal end notches 62, 62 and angled distal end notches 64, 64a.

Figure 14:
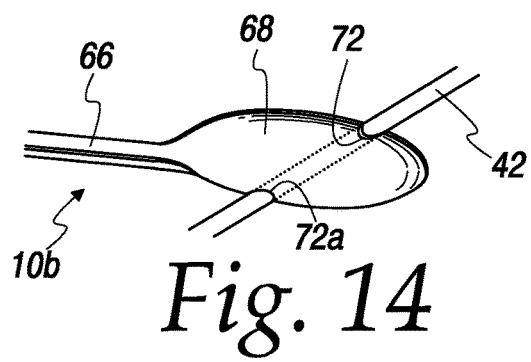

Turning to FIG. 14, this figure shows one arm 66 of tongs 10b and it will be understood that the other arm will have a similar configuration. In this embodiment, the grasping member 68 includes one or more pairs of notches in the upper and lower edges of the grasping member 68 wherein the notches are configured to engage the bars 42 of a cooking grate. In FIG. 14, the grasping member 68 includes a pair of opposed offset notches 72, 72a that are configured to engage bars of a cooking grate. Turning to FIGS. 16 and 17, grasping members 68, 68a each include a first set of offset notches 72, 72a and a second set of offset notches 74, 74a. The set of notches may be spaced apart at any distance from each other. Additionally, each pair of notches may be aligned differently as to provide different gripping angles depending on the top-to-bottom orientation of the tongs. As can be seen comparing FIG. 16 to FIG. 17, notches 72, 72a provide a different grate gripping angle than notches 74, 74a. In particular, notches 72, 72a have a steeper gripping angle than notches 74, 74a.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A pair of tongs comprising:
opposed first and second tong arms each having a proximal end portion and a distal end portion wherein the proximal end portions of the tong arms are pivotally attached to each other so that the distal end portions of the first and second tong arms are moveable inwardly toward each other and outwardly away from each other;
the distal end portions of each of the first and second tong arms defining a grasping surface for grasping items between the distal end portions of the first and second tong arms when the first and second tong arms are moved inwardly toward each other, the grasping surface comprising a flange; and
the distal end portions of each of the first and second tong arms having a cooking grate bar engaging member configured to engage and grasp bars of a cooking grate, wherein each of the cooking grate bar engaging members comprises an elongated channel extending along the respective flange, the elongated channels sized and configured to grasp an elongated portion of the bar of the cooking grate when the first and second tong arms are moved toward each other.

2. The tongs of claim 1 wherein the elongated channels are generally U-shaped.

3. The tongs of claim 1 wherein the elongated channels are general C-shaped.

4. The tongs of claim 1 wherein the elongated channels are generally V-shaped.

5. The tongs of claim 1 wherein each of the elongated channels is at least partially defined by a bottom edge of its respective grasping surface, where in the bottom edge extends from the grasping surface.

6. The tongs of claim 1 wherein the elongated channels are substantially parallel to one another when engaged with bars of the cooking grate.

7. The tongs of claim 1 wherein each of the first and second tong arms has a longitudinal axis and each of the elongated channels extends at an angle to the longitudinal axis of its respective tong arm.

8. The tongs of claim 7 wherein each of the elongated channels extend between about 5 degrees and about 90 degrees to the longitudinal axis of its respective tong arm.

9. The tongs of claim 7 wherein each of the elongated channels extend at about a 30 degrees angle to the longitudinal axis of its respective tong arm.

10. The tongs of claim 1 wherein each flange extends above and/or below the cooking grate bar engaging member.

11. The tongs of claim 10 wherein the flange is a substantially spoon-shaped member.

12. The tongs of claim 1 wherein the tong arms are at least partially coated with an insulating material.

13. The tongs of claim 1 wherein the proximal ends of the first and second tong arms are connected by a hinge.

14. A pair of tongs comprising:
opposed first and second tong arms each having a proximal end portion and a distal end portion wherein the proximal end portions of the tong arms are pivotally attached to each other so that the distal end portions of the first and second tong arms are moveable inwardly toward each other and outwardly away from each other;
the distal end portions of each of the first and second tong arms defining a grasping surface for grasping items between the distal end portions of the first and second tong arms when the first and second tong arms are moved inwardly toward each other; and
the distal end portions of each of the first and second tong arms having a cooking grate bar engaging member configured to engage and grasp bars of a cooking grate, wherein each of the cooking grate bar engaging members comprises at least one pair of opposed offset notches comprising a first notch and a second notch, wherein the pair of notches are located along a first axis with the first notch located in a top edge of the grasping surface and the second notch located in a bottom edge of the grasping surface.

15. The tongs of claim 14 wherein the at least one pair of opposed offset notches of each of the grasping surfaces comprises a first pair of opposed notches and a second pair of opposed notches.

16. The tongs of claim 15 wherein the first set of opposed notches has a first axis that extends at a different angle to an elongated axis of the tong arm than a second axis of the second set of opposed notches.

17. A pair of tongs comprising:
 a first tong arm having a proximal end portion and a distal end portion;
 a second tong arm having a proximal end portion and a distal end portion, wherein the proximal end portion of the second tong arm is pivotally attached to the proximal end portion of the first tong arm so that the distal end portions of the first and second tong arms are moveable inwardly toward each other and outwardly away from each other;
 the distal end portions of the first and second tong arms each having a grasping member wherein each grasping member includes an elongated channel extending therealong for engaging bars of a cooking grate, the elongated channels sized and configured to grasp an elongated portion of the bar of the cooking grate when the first and second tong arms are moved toward each other.

18. The tongs of claim 17 wherein the channels are generally U-shaped.

19. The tongs of claim 17 wherein the channels are at least partially formed by an edge of the grasping member.

\* \* \* \* \*